United States Patent [19]

LaManna

[11] Patent Number: 5,406,422

[45] Date of Patent: Apr. 11, 1995

[54] METHOD OF ADJUSTING HEAD SKEW OF MAGNETIC RECORDING HEADS

[75] Inventor: Richard J. LaManna, Morristown, N.J.

[73] Assignee: Card Technology Corporation, Paramus, N.J.

[21] Appl. No.: 139,042

[22] Filed: Oct. 21, 1993

[51] Int. Cl.$^6$ .................... G11B 25/04; G06K 7/00
[52] U.S. Cl. ................................. 360/2; 235/438
[58] Field of Search ............. 360/2, 31, 53; 235/438, 235/449, 450

[56] References Cited

U.S. PATENT DOCUMENTS

| | | | |
|---|---|---|---|
| 3,949,424 | 4/1976 | Jollyman | 360/2 |
| 4,088,216 | 5/1978 | LaManna et al. | 400/130 |
| 4,180,837 | 12/1979 | Michaud | 360/2 |
| 4,969,760 | 11/1990 | LaManna et al. | 400/134 |

OTHER PUBLICATIONS

International Standard ISO 7811/2, 1st Ed. Dec. 15, 1985 pp. 1–8.

*Primary Examiner*—Donald Hajec
*Assistant Examiner*—Won Tae C. Kim
*Attorney, Agent, or Firm*—Antonelli, Terry, Stout & Kraus

[57] ABSTRACT

A method of adjusting alignment of a magnetic head to be within an alignment specification in accordance with the invention includes recording on magnetic material of a test card a digital code having a greater number of bits per unit length than the set number of bits used for conventional magnetic recording of credit cards. The test card produces an electrical playback signal which varies in magnitude with head alignment at a second rate greater than a first rate produced during conventional recording. The test card is read repeatedly and alignment of the head is adjusted until a maximum electrical playback signal is produced indicating that the head is set within the alignment specification.

12 Claims, 3 Drawing Sheets

METHOD OF ADJUSTING HEAD SKEW OF MAGNETIC RECORDING HEADS

TECHNICAL FIELD

The present invention relates to a method of adjusting the alignment of magnetic heads used to record data tracks on cards, such as credit cards, and further to a method for checking if a previously aligned magnetic recording head is still within specification.

BACKGROUND ART

A conventional credit card, as illustrated in FIG. 1, contains a magnetic stripe on which is encoded several tracks of binary data which are magnetically recorded with a magnetic recording head which may be part of a credit card embossing machine or part of other card processing apparatus, such as a graphics printer, used for printing photographic images of a card holder etc. on the card. The United States and Japan have set standards for recording the magnetic stripes of credit cards. The American standard is known as the ANSI X4.16-1983 which is a revision of ANSI X4.16-1976 and ANSI X4.16A-1977. This standard sets a basic density of 210 bits per inch on the magnetic stripe of a credit card to be used for financial services which has three tracks of data. Similarly, the Japanese standard, known as NTT, also specifies 210 bits per inch of binary data encoded on the magnetic stripe of a credit card.

It is necessary for a credit card embosser or other mechanism which records the tracks of data on credit cards to have the magnetic recording head adjusted within an alignment specification from a true normal to the longitudinal axis of the magnetic recording medium. The United States Standard is ±20 minutes and the Japanese Standard is ±10 minutes which hereinafter are referred to as the "specification" or the "alignment specification". Alignment within this specification is necessary to produce an acceptable recording level of the tracks of data on the magnetic recording medium of the credit card to facilitate reading by magnetic card readers used commonly today with financial transactions. The solid line in FIG. 1 is the true normal desired orientation and the dotted line represents a misalignment of the longitudinal axis of the magnetic head (not illustrated) recording the binary data from the desired true normal. The present invention pertains to the adjustment of the longitudinal axis of the magnetic head from a misalignment represented by the dotted line to be as close as possible to the true normal represented by the solid line.

The current method of adjustment of the alignment of the magnetic head in a recording system for magnetic stripes of credit card embossing machines is very tedious. The adjustment entails the previously described orientation of the longitudinal axis of the magnetic head to the solid line orientation of FIG. 1. The Assignee aligns the magnetic recording heads of credit card embossers by loosening or tightening screws as described below which move the longitudinal axis of the head relative to a normal to the longitudinal axis along which the magnetic stripe of a credit card travels and to the longitudinal axis of the magnetic stripe being recorded by the magnetic recording head of the credit card embosser. The Assignee's method of adjusting head skew involves making a recording with the standard bit density of 210 bits per inch on a credit card blank followed by making the magnetic bits visible with an iron powder developer. Thereafter, measurement of the complement of the angle illustrated in FIG. 1 is made.

FIGS. 2 and 3 illustrate the head mounting mechanism of the Assignee's Advantage credit card embosser. As illustrated therein, a magnetic head 12 for recording three tracks is mounted in a support block 14. The support block has a slot 16 which extends almost completely across its width, permitting the portion of the support block on which the magnetic head is mounted to be rotated causing the longitudinal axis of FIG. 1 as identified by the dotted line to move toward or away from the true normal identified by the solid line by the tightening or loosening of screws 18 and 20. The tightening or loosening of the screws 18 and 20 permits the angular adjustment through a number of minutes to bring the alignment angle within the specification of alignment to the true normal identified by the solid line.

This measurement is made with a toolmaker's microscope which is used to read the complement of the angle of FIG. 1 to determine how many minutes of angle the longitudinal axis is out of specification from the true normal. When the angle is outside of the specification, the position of the head is adjusted by tightening or loosening the screws 18 and 20 to attempt to bring it within specification. Thereafter, a card is again recorded, developed with iron powder and the complement of the angle of FIG. 1 is again measured until proper adjustments have been made to bring the head into the specification. This is a trial and error method which is time consuming and does not readily produce accurate adjustments. As a consequence, the alignment of the head in a credit card embossing machine prior to shipment to a customer is an expensive process which is not done with the highest precision.

An out of specification alignment of a magnetic head in an embosser or other credit card processing apparatus which records the magnetic stripe can cause magnetically encoded credit cards to be rejected because of poor signal response of the magnetic head due to misalignment. During embossing of credit cards, the magnetic stripe is recorded and then read to verify the correctness of the recorded data. Credit card embossers, such as the Assignee's Advantage, monitor the output signal from the magnetic head in reading the previously recorded digital data. A variable level threshold detector of the embosser is set at the factory to a level to reject cards which produce a playback signal of the digital data below the threshold which rejects recorded cards having recording or magnetic stripe defects.

Furthermore, there is a need to permit the actual customer who receives the embossing or other credit card processing machine to, from time-to-time, measure the alignment of the magnetic recording head to determine if it is within the specification as set at the factory. There is no current methodology which permits this to be done other than to duplicate the process described above which is performed by the manufacturer which is not acceptable for customers because of the specialized equipment and expertise required to perform the process.

DISCLOSURE OF INVENTION

The present invention relates to a method of adjusting alignment of a magnetic head to be within a factory specification and further to a method for customer testing if the previously aligned head is within the previously set factory specification. The present invention is a simplification of the prior art in that it permits the original (factory) alignment of a magnetic head within the specification to be done in a much simpler manner utilizing only specially recorded test cards and conventional electrical signal measuring apparatus such as an oscilloscope to monitor the output level from the magnetic head upon playback of the specially recorded test cards. With the invention, a test card having a bit density per unit length which is higher than the conventional bit density per unit length used in the industry for conventional credit cards is recorded with a perfect alignment of the data on the longitudinal track on the test card. Perfect alignment is parallel to the solid line in FIG. 1. Thereafter, the test card, which because of the increased magnetic density, such as with a density of twice that of the conventional credit card being preferred, is played back by the magnetic head which is to be aligned to determine its electrical signal response as read by a voltage measuring device such as an oscilloscope. The test card is repeatedly read and the alignment of the head is adjusted by using a conventional alignment adjustment mechanism, such as that described above in FIGS. 1 and 2, until the electrical signal output reaches a maximum. The head is considered to be aligned when the maximum signal response is produced which theoretically and in practice occurs when the magnetic head is precisely aligned within the specification. This process takes only a fraction of the time to set up the head of a credit card embossing machine or other credit card processing apparatus which records magnetic stripes as compared to the prior art discussed above and utilizes equipment, such as an oscilloscope, which is conventionally present at manufacturing facilities. The test card having a higher density of data than that of the conventional card, is inexpensive, is easily made and may be readily duplicated.

Furthermore, the present invention permits a customer of a credit card embossing machine or other recording device of magnetic stripes on cards requiring a head to be precisely aligned to test if the head is within the previously factory set specification. The test procedure requires a threshold detector which is present in a conventional credit card embossing machine with magnetic stripe recording capability or other card processing device which records a magnetic stripe on a card to be set to be such that the threshold is slightly below the electrical signal response produced by a dropout recorded within a test track of a second test card which is recorded with the same increased density of data described above with regard to the test card used for the factory head alignment procedure. As a result, the second test card upon playback by the head at the factory will be determined to be an acceptable card as a consequence of the signal level produced by playback in the dropout section of the second test card being above the threshold.

The increased density of the recorded test track of the second test card including dropout produces a playback signal with wide dynamic range which varies as a function of alignment of the longitudinal axis of the magnetic head from the true normal. This wide dynamic range permits the threshold level to be set at a level for determining if the magnetic stripe of credit cards recorded with the industry normal lesser density for recording data have a dropout of a lesser playback signal level representative of insufficient magnitude signal levels encountered when reading credit card magnetic cards with magnetic stripe readers and additionally testing with the second test card to determine head alignment within the factory specification.

Proper alignment of the head is necessary for the customer to produce the playback signal from the first test card above the threshold of the threshold detector of the card processing device which records magnetic stripes. Therefore, reading of the first test card by a customer which produces an amplitude above the threshold is a true indication that the head is still within the factory alignment specification. The customer of the card processing device which records magnetic stripes may periodically run the first test card through the credit card embosser or other card magnetic stripe recording device to determine if the head is aligned by the card being read as an acceptable card because the playback signal from the head always exceeds the threshold or the card is not an acceptable card indicating that the head is now outside of the originally factory set specification. Providing the customer of a credit card embosser or other card processing device which records magnetic stripes with the ability to periodically determine if the magnetic head is within the original factory specification can be an important matter to customers. The Assignee of the present invention has encountered requests from customers in Japan for a method to test if the magnetic head is within the specification prior to embossing groups of cards.

A method of adjusting alignment of a magnetic head to be within an alignment specification, the head being used for recording digital code having a set number of bits per unit length on magnetic material of cards and playback of the digital code recorded on the magnetic material by the head producing an electrical playback signal which varies in magnitude at a first rate with head alignment in accordance with the invention includes recording on magnetic material of a test card without skew measured normal to a longitudinal axis of the magnetic material a digital code having a greater number of bits per unit length than the set number of bits, the magnetic head in response to the recorded digital code of the test card producing an electrical playback signal which varies in magnitude with head alignment at a second rate greater than the first rate; and repeatedly reading the test card with the head and adjusting alignment of the head until a maximum electrical playback signal is produced which indicates the head is set within the alignment specification. The cards are flat and may be credit cards. Two hundred ten bits per inch are recorded on the credit cards and four hundred twenty bits per inch are recorded on the test card. The electrical playback signal from the test card varies at a rate four times greater than the playback signal from the credit cards in response to alignment variation of the head.

A method of testing if a magnetic head, previously set within an alignment specification and used for recording digital code having a set number of bits per unit length on magnetic material of cards, is within the previously set specification in accordance with the invention includes recording on magnetic material of a first test card without skew measured normal to a longitudinal axis of the magnetic material of the first test card a digital code having a greater number of bits per unit length than the set number of bits; recording on magnetic material of a second test card without skew measured normal to a longitudinal axis of the magnetic material of the second test card a digital code having the greater number of bits per unit length than the set number of bits and a dropout within the recorded digital code of the second test card, the magnetic head in response to the recorded digital code of the second test card producing an electrical signal which includes a maximum playback amplitude and a dropout playback amplitude which is less than the maximum amplitude; adjusting a threshold of a dropout detector in response to the electrical playback signal of the second test card from the head to be below the dropout playback amplitude produced by playback of the second test card; and the dropout detector, in response to playing back the first test card with the head, producing a test playback signal used for determining if the playback signal has an amplitude above or below the threshold with a determination of the test playback signal is above the threshold by the threshold detector indicating that the head is within the alignment specification and a determination of the playback signal is below the threshold indicating that the head is outside the alignment specification. The cards are flat and may be credit cards. Two hundred ten bits per inch are recorded on the credit cards and four hundred twenty bits per inch are recorded on the first and second test cards. The playback signal from the first and second test cards varies at a rate four times greater than the playback signal from the credit cards in response to alignment variation of the head from a normal to the longitudinal axis of the magnetic material.

BEST MODE FOR CARRYING OUT THE INVENTION

Figure 3:
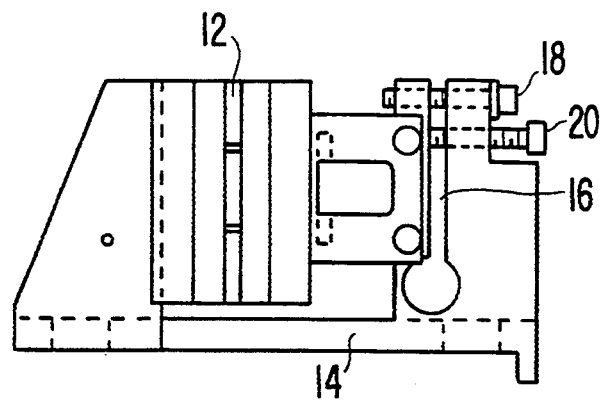
FIG. 3 illustrates a side elevational view of the head mounting mechanism and alignment mechanism of the Assignee's Advantage embosser which has been rotated 90° from FIG. 2.
Figure 4:
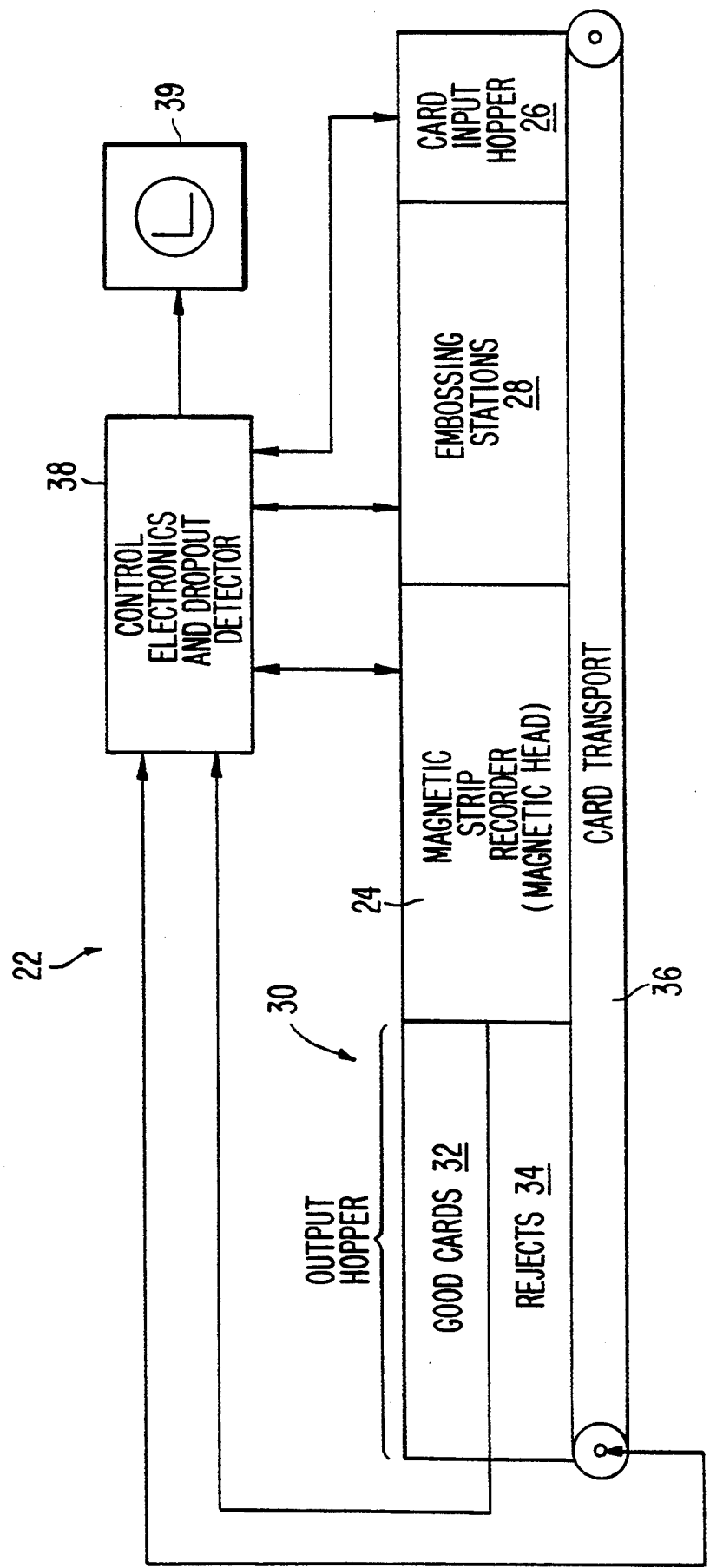
FIG. 4 illustrates a simplified block diagram of a credit card embossing machine having a head requiring alignment within an industry specification for recording credit cards on which the present invention may be produced.

FIG. 4 illustrates a simplified block diagram of a credit card embosser 22 having a magnetic head 24 requiring alignment within the specification. It should be understood that credit card embossers are well known and commercially sold by the Assignee of the present invention. The Assignee markets a credit card embosser under the trademark ADVANTAGE which is disclosed in U.S. Pat. No. 4,969,760 which is incorporated herein by reference in its entirety. A preferred form of the head mounting mechanism and the adjustment mechanism of the head 24 used in the practice of the invention for adjusting the alignment of the magnetic head is in accordance with FIGS. 2 and 3 described above.

Figure 1:
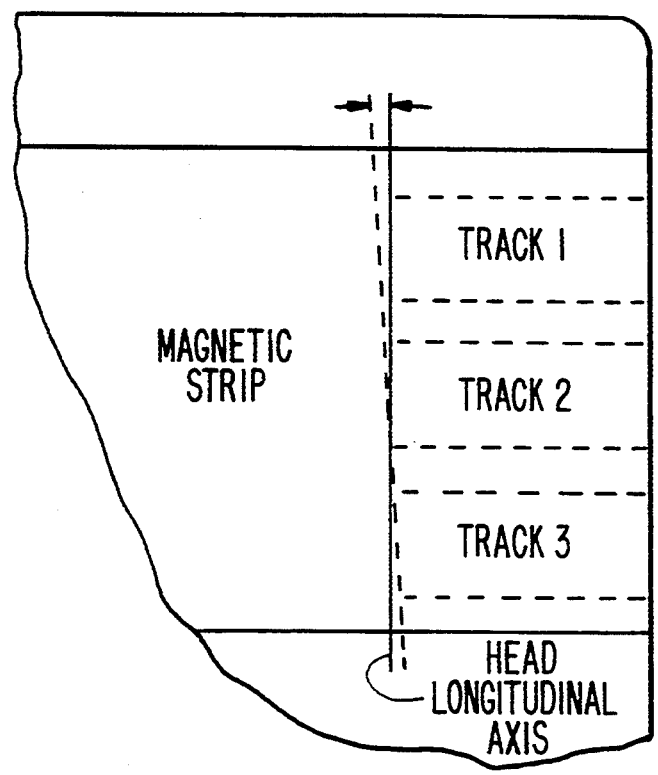
FIG. 1 illustrates a prior art credit card with recorded tracks on a magnetic stripe and variation of the longitudinal axis of a magnetic recording head relative to the longitudinal axis.

The embosser 22 used with the practice of the process of the present invention includes a card input hopper 26 for storing blank cards, as discussed in conjunction with FIG. 1, to be embossed with alphanumeric information which is not part of the present invention and further magnetically encoding binary information in accordance with one of the industry standards on a magnetic stripe as illustrated in FIG. 1. Credit card blanks are loaded in the card input hopper 26 which each include a stripe of magnetic recording medium, such as illustrated in FIG. 1, on which one or more tracks of digital information are recorded at 210 bits per inch. The embosser 22 also contains one or more embossing stations 28 and an output hopper 30 with a first compartment 32 for receiving good cards and a second compartment for receiving bad cards 34. Card transport 36 moves the cards through the aforementioned parts of the embosser 22. The control electronics 38 control the aforementioned parts of the embosser 22. Determination if cards are good or bad is well known by reading the cards for dropouts below a threshold of dropout detector or other recording errors. The dropout detector is part of the control electronics 38. The dropout detector has a variable threshold which is adjusted with a potentiometer to set the threshold level to a desired level which determines whether or not a card is read as an acceptable card or a rejected card. Furthermore, as described below, the output of the magnetic recording head during playback may be read by a signal level detecting device such as an oscilloscope 39. All of the aforementioned parts of the embosser 22 are prior art as exemplified by the Assignee's Advantage. The oscilloscope 39 is not used with prior art embossers to set a threshold level for a dropout detector for the purpose of testing any aspect of alignment of the magnetic head 24.

Figure 5:
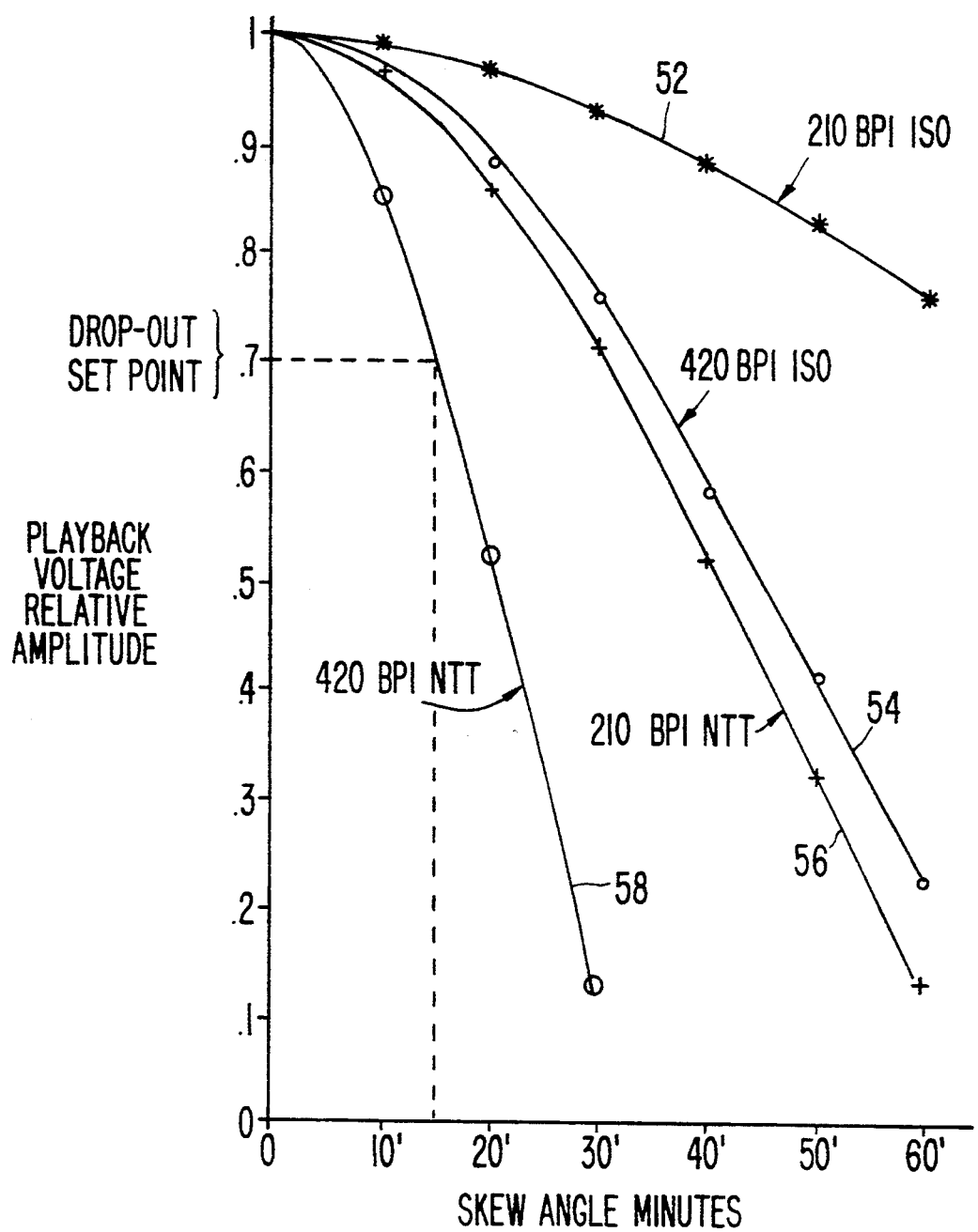
FIG. 5 illustrates a graph of playback voltage amplitude of the magnetic head of FIGS. 2 and 3 as a function of skew angle measured from a normal to a longitudinal axis of the magnetic stripe in minutes for a conventional credit card recorded at 210 bits per inch under the American and Japanese standards and first and second test cards used with the present invention having a density of 420 bits per inch.

The present invention uses a first test card which has recorded thereon a digital code having a greater number of bits per unit length than the set number of bits used in the industry which is 210 bits per inch. The test card is preferably a conventional credit card with the exception that it is recorded with a greater number of bits which preferably is 420 bits per inch. The magnetic head 24 produces an electrical playback signal which varies in magnitude at a first rate with head alignment for conventional credit cards. The first rate is illustrated in FIG. 5 as response characteristics 52 and 56 which respectively illustrate the alignment response of the magnetic head 24 to conventional credit cards having their magnetic tracks encoded by the American and Japanese standards. The first and second test cards produce an electrical signal which varies in magnitude with head alignment at a second rate greater than the first rate. FIG. 5 illustrates the second rate as response characteristics 54 and 58 which respectively illustrate the response of the magnetic head 24 to the American and Japanese standards at the higher test magnetic bit recording density. The legend ISO in FIG. 5 is a reference to standards proposed by the International Organization for Standardization which issues technical standards. The 210 BPI ISO and 420 BPI ISO legends refer to recording of magnetic tracks in accordance with standards of the International Organization for Standardization involving identification cards. See International Standard ISO 7811/2 First Edition 1985-12-15.

Figure 2:
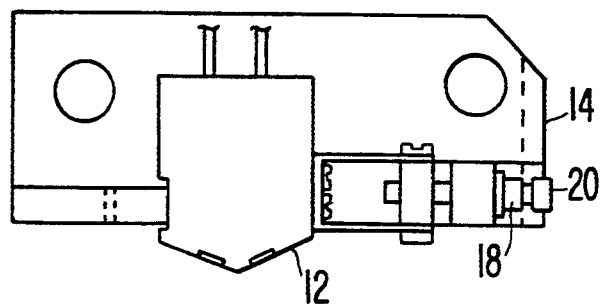
FIG. 2 illustrates a side elevational end view of a head mounting mechanism and alignment mechanism utilized by the Assignee's Advantage credit card embosser.

The electrical signal produced by a magnetic head is a function of the width of the magnetic head, as illustrated in FIG. 1 which is magnetically coupled to each separate track as the magnetic stripe moves orthogonally past the head gap and further the number of bits per inch. As is apparent from inspection of FIG. 5, the rate of change of the magnetic head 24 to alignment variation is increased by four times when the density of the magnetic recording medium of a test card is doubled when compared to the playback signal from credit cards in response to alignment variation of the head. As a result, the recorded first and second test cards produce a rate of change of the response of the magnetic head to alignment variation which is much greater than a rate of change for normal density credit cards. This greater slope permits the measurement of the output signal from the magnetic head 24 in response to the increased density magnetic recording of the first test card to be used directly to align the recording head at the factory by repeatedly reading the first test card with the head and adjusting alignment of the head until a maximum electrical playback signal is produced on the oscilloscope 38 or other conventional voltage measuring device which indicates the head is set within the specification. The screws 18 and 20 of FIGS. 2 and 3 are adjusted to produce the angular adjustment of the head which is used to maximize the electrical signal output from the magnetic head voltage measuring device.

Furthermore, the present invention permits a customer to test if a credit card embosser or other card processing device which records digital data on the magnetic stripe of a credit card blank is still within the factory alignment specification after use of the magnetic recording head to record digital information on the magnetic stripes of credit cards. A second test card, which preferably also is a conventional credit card blank, is recorded without skew measured normal to a longitudinal axis of the magnetic material with a digital code having the greater number of bits per unit length as described above in the process for initially aligning the magnetic head. Preferably, the number of bits is 420 bits per inch. The second test card further has a dropout within the recorded digital code. The dropout may be as narrow as 1 bit and may have a level producing a response of 70% of the maximum signal level as illustrated in FIG. 5. The head in response to the second test card produces an electrical playback signal which includes a maximum playback amplitude and a dropout playback amplitude which is less than the maximum amplitude. The threshold of the dropout detector within the control electronics 30 of the embosser 22 is adjusted in response to the playback of the second test card from the head to be just below the dropout playback amplitude produced by playback of the second test card which is perfectly recorded without skew which maximizes the response of the head as a function of head alignment as illustrated in FIG. 5. Thereafter, the customer causes the head 24 to play back the first test card. The control electronics determines if the playback signal has an amplitude above or below the dropout detector threshold. A determination of the playback signal being above the threshold of the dropout detector is an indication that the head is within the alignment specification and a determination of the playback signal being below the threshold of the dropout detector is an indication that the head is outside the alignment specification. The playback signal level may be determined by seeing if the first test card ends up in the good card tray 32 which is an indication that the signal level is above the threshold or in the reject card tray 34 which is an indication that signal level is below the threshold. Proper head alignment is indicated by the first test card being fed into the tray 32 and improper head alignment is indicated by the first test card being fed into tray 34.

The first and second test cards are preferably recorded at 420 bits per inch which is twice the standard industry density for credit cards of 210 bits per inch. The threshold detector may be set at a level such as 70% of the maximum level produced by playback of the test increased density magnetic recording of a credit card blank recorded at 420 bits per inch without skew and any dropouts being present. The 70% level provides the ability to test head alignment, as described above under the Japanese specification, and further to separate processed credit cards having good and erroneously recorded magnetic stripes. It is not necessary that the alignment of the head be within the specification to record commercially acceptable credit cards. It is for this reason that the 70% magnitude, as illustrated in FIG. 5, is chosen to test for alignment within ±15 minutes even though the Japanese specification is ±10 minutes. A different threshold other than 70% would be chosen for the customer to test for the United States specification.

While the invention has been described in terms of its preferred embodiment, it should be understood that numerous modifications may be made thereto without departing from the spirit and scope of the invention as defined in the appended claims. It is intended that all such modifications fall within the scope of the appended claims.

I claim:

1. A method of adjusting alignment of a magnetic head to be within an alignment specification, the head being used for recording digital code having a set number of bits per unit length on magnetic material of cards and playback of the digital code recorded on the magnetic material by the head producing an electrical playback signal which varies in magnitude at a first rate with head alignment, comprising:

recording a digital code having a greater number of bits per unit length than the set number of bits on magnetic material of a test card without skew measured normal to a longitudinal axis of the magnetic material, the magnetic head in response to the recorded digital code of the test card producing an electrical playback signal which varies in magnitude with head alignment at a second rate greater than the first rate; and repeatedly reading the test card with the head and adjusting alignment of the head until a maximum electrical playback signal is produced which indicates the head is set within the alignment specification.

2. A method in accordance with claim 1 wherein: the cards are flat.

3. A method in accordance with claim 2 wherein: the flat cards are credit cards.

4. A method in accordance with claim 3 wherein: two hundred ten bits per inch are recorded on the credit cards.

5. A method in accordance with claim 4 wherein: four hundred twenty bits per inch are recorded on the test card.

6. A method in accordance with claim 5 wherein:

the electrical playback signal from the test card varies at a rate four times greater than the playback signal from the credit cards in response to alignment variation of the head from a normal to the longitudinal axis of the magnetic head.

7. A method of testing if a magnetic head, previously set within an alignment specification and used for recording digital code having a set number of bits per unit length on magnetic material of cards, is within the previously set specification comprising:

recording on magnetic material of a first test card without skew measured normal to a longitudinal axis of the magnetic material of the first test card a digital code having a greater number of bits per unit length than the set number of bits; and recording on magnetic material of a second test card without skew measured normal to a longitudinal axis of the magnetic material of the second test card a digital code having the greater number of bits per unit length than the set number of bits and a dropout within the recorded digital code of the second test card, the magnetic head in response to the recorded digital code of the second test card producing an electrical playback signal which includes a maximum playback amplitude and a dropout playback amplitude which is less than the maximum amplitude;

adjusting a threshold of a dropout detector in response to the electrical playback signal of the second test card from the head to below the dropout playback amplitude produced by playback of the second test card; and the dropout detector, in response to playing back the first test card with the head, producing a test playback signal used for determining if the playback signal has an amplitude above or below the threshold with a determination of the test playback signal being above the threshold by the threshold detector indicating that the head is within the alignment specification and a determination of the test playback signal being below the threshold indicating that the head is outside the alignment specification.

8. A method in accordance with claim 7 wherein:
the cards are flat.

9. A method in accordance with claim 8 wherein:
the flat cards are credit cards.

10. A method in accordance with claim 9 wherein:
two hundred ten bits per inch are recorded on the credit cards.

11. A method in accordance with claim 10 wherein:
four hundred twenty bits per inch are recorded on the test card.

12. A method in accordance with claim 10 wherein:
the playback signal from the test card varies at a rate four times greater than the playback signal from the credit cards in response to alignment variation of the head from a normal to the longitudinal axis of the magnetic head.

* * * * *